Sept. 5, 1967 T. SCARBOROUGH 3,339,643
SOIL WORKING MACHINE
Filed Sept. 11, 1964 3 Sheets-Sheet 1

Troy Scarborough
INVENTOR.

BY *Clarence A. O'Brien*
*and Harvey B. Jacobson*
Attorneys

Sept. 5, 1967   T. SCARBOROUGH   3,339,643
SOIL WORKING MACHINE
Filed Sept. 11, 1964   3 Sheets-Sheet 2

Troy Scarborough
INVENTOR.

Sept. 5, 1967  T. SCARBOROUGH  3,339,643
SOIL WORKING MACHINE

Filed Sept. 11, 1964  3 Sheets-Sheet 3

Troy Scarborough
INVENTOR.

BY *Clarence A. O'Brien*
and *Harvey B. Jacobson*
Attorneys

3,339,643
SOIL WORKING MACHINE
Troy Scarborough, 711 S. May Ave.,
Brooksville, Fla. 33512
Filed Sept. 11, 1964, Ser. No. 395,781
5 Claims. (Cl. 172—184)

ABSTRACT OF THE DISCLOSURE

A machine comprising first and second spaced parallel ballast receiving rollers and means for selectively engaging either or both rollers with the ground for independent operation. The first roller is provided with a plurality of mulch embedding circular blades while the following roller is provided with a plurality of packing elements.

---

The present invention is generally concerned with a soil working machine, and is more specifically directed to a device particularly adapted for use in erosion control work.

As will be appreciated, it is common to apply a continuous blanket of hay or straw mulch when planting on highway shoulders, slopes, etc., as an erosion control means. It is a primary intention of the instant invention to provide a device which operates so as to positively embed the mulch in the soil in spaced continuous generally parallel rows so as to create, in effect, small terraces or erosion control dams, thereby providing for a vastly superior utilization of the mulch for the purpose at bar.

In conjunction with the above object, it is also an object of the instant invention to incorporate packing means into the machine so as to not only embed the mulch in the soil, but so as to also compact the soil and mulch into a generally homogeneous mass.

Furthermore, it is an object of the instant invention to incorporate various means whereby the weight of the machine can be varied for purposes of ensuring a greater soil penetration, or a greater soil packing weight.

In addition, it is an object of the instant invention to provide a device which can be utilized in the planting of jointed grasses, those grasses generally having creeping stems.

Also, it is a significant object of the instant invention to provide a machine which is capable of being drawn by a conventional tractor.

Likewise, it is an object of the instant invention to provide a machine which is of a simple though highly rugged nature requiring only normal maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
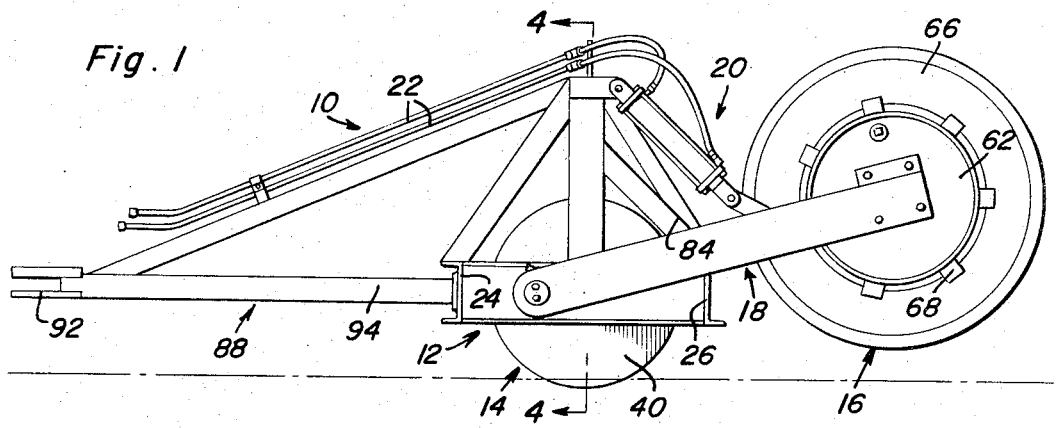
FIGURE 1 is a side elevational view of the device of the instant invention with the packing roller means raised off the ground.
Figure 2:
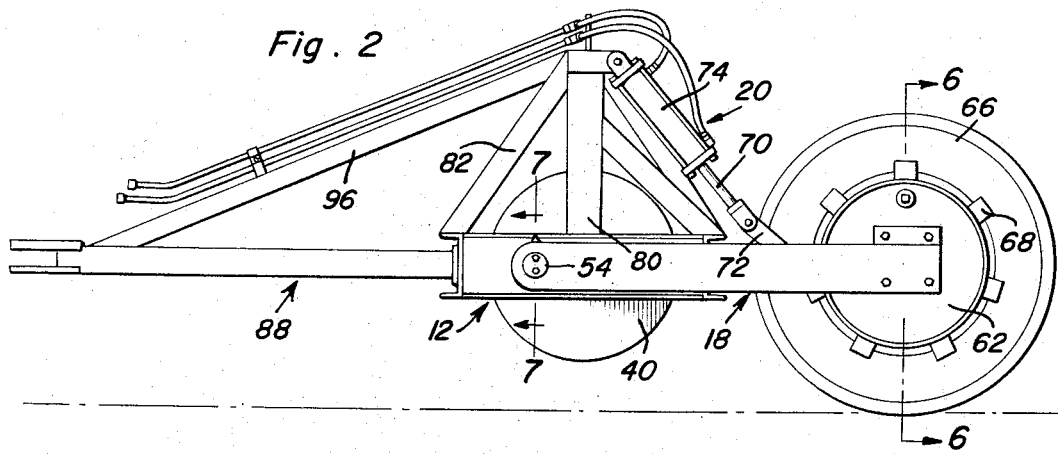
FIGURE 2 is a view similar to FIGURE 1 with the cutting roller means raised off the ground.

Basically, the machine 10 of the instant invention includes a rectangular frame 12 rotatably mounting cutter roller means 14 therein with packing roller means 16 being rotatably mounted rearward of the frame 12 through a pair of rearwardly extending pivot arms 18 which allow a vertical adjustment of the packing roller means 16 controlled by extensible hydraulic double acting ram cylinders 20 which in turn include hydraulic fluid lines 22 connected to the hydraulic system of a tractor which will be utilized to pull the machine.

The frame 12 is rectangular in shape and includes front, rear, and side channel-shaped frame members 24, 26 and 28 rigidly welded together. In addition, each of the side frame members 28 is rigidified or strengthened by a capping channel member 30 telescoped in the open side of the channel-shaped member 28.

Extending transversely between the side members 28, and rotatably supported thereby through tapered roller bearing means 32, is an elongated shaft 34. The cutter roller means 14 is fixed to this shaft 34 and rotatable therewith. The roller means 14 includes an elongated cylindrical hollow drum 36 having a capped hole 38 through one end thereof so as to allow for the introduction of weight increasing ballast, generally water. In addition, the roller means 14 includes a plurality of circular blades 40 welded to the drum 36 at longitudinally spaced points therealong, these blades 40, aside from the two end ones which are solid so as to form the end walls of the cylindrical drum 36, are in fact annular in shape so as to be received completely about the drum 36. The outer peripheral edge 42 of each of the blades 40 is beveled, this bevel being directed toward the transverse center of the drum 36, so as to facilitate ground penetration, and further, has the extreme end 44 thereof slightly rounded so as to tend to effect a pushing of the hay and straw mulch into the ground rather than an actual severing thereof. As will be appreciated, the degree of penetration in the ground can be varied by varying the amount of ballast within the drum 36.

Figure 7:
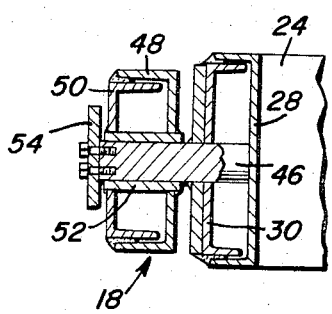
FIGURE 7 is an enlarged partial cross-sectional view taken substantially on a plane passing along line 7—7 in FIGURE 2.
Figure 8:
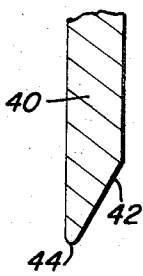
FIGURE 8 is a partial cross-sectional view through the outer portion of one of the circular cutting blades, illustrating the manner in which the edge thereof is to be beveled.
Figure 3:
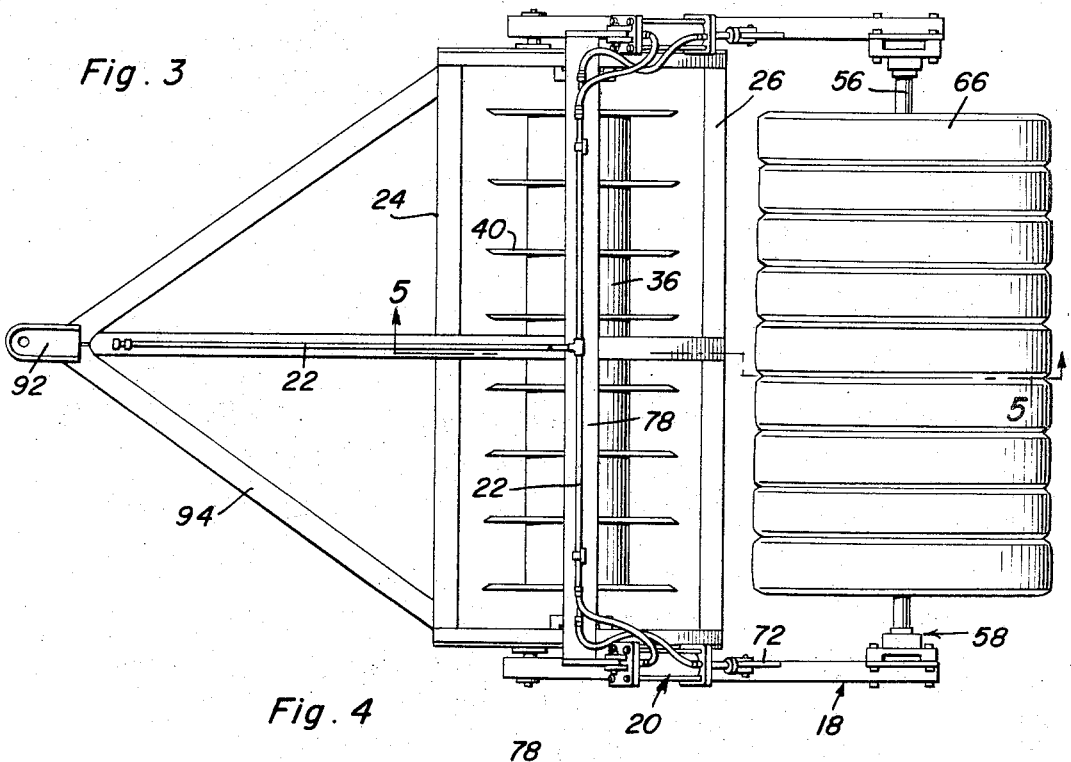
FIGURE 3 is a top plan view of the machine.

Projecting laterally from each of the support frame side members 28 is a rigid stub shaft or pivot pin 46, these pivot pins 46 pivotally mounting the pair of lever arms 18. With reference to FIGURE 7, it will be noted that each of the lever arms 18 consists of an elongated main channel member 48, and a smaller capping channel member 50 received therein so as to form a box-like unit. Both of the channel members 48 and 50 have a hollow sleeve 52 extending therethrough and welded thereto, this sleeve 52 being rotatably received on the corresponding pivot pin or stub shaft 46, with an end plate 54 being bolted to the outer end of the pivot pin 46 so as to retain the corresponding lever arm 18 thereon.

Rotatably mounted between the outer ends of the lever arms 18 is the packing roller means 16. This is achieved through an elongated mounting shaft 56 extending transversely between the outer or rear ends of the arms 18 and being rotatably engaged therewith by tapered roller bearing means 58. The actual packing roller means 16 consists of an elongated cylindrical hollow drum 60 including two watertight end walls 62, one of which includes a capped aperture 64 therethrough so as to allow for the introduction of ballast to the drum 60, this weight increasing ballast being generally water. In addition, the drum 60 has a series of side-by-side annular tire-like hollow resilient packing elements 66 engaged thereabout for the full length of the drum 60. These elements 66 are to preferably be, in actual practice, discarded truck or aeroplane tires, and are retained on the circular or cylindrical drum 60 through upwardly projecting peripherally spaced keeper lugs 68 provided at both ends of the drum 60.

The pivotal adjustment of the lever arms 18, and consequently the vertical adjustment of the packing roller means 16, is effected through the two hydraulic double acting ram cylinders 20 which are, of course, to be simultaneously actuated from the conventionally provided hydraulic system on the towing vehicle through the lines 22. Each of the motors 20 is mounted, adjacent opposite sides of the frame 12, at a downwardly and rearwardly inclined angle with the remote end of the piston 70 pivotally engaged with an upwardly angled ear 72 fixed to the corresponding lever arm 18. At the same time, the remote end of the cylinder 74 is pivotally engaged with an ear 76 rigid with a transversely extending box beam 78 formed of a pair of facing channel members welded to each other. This box beam 78 is supported in a raised position over the frame 12 by a pair of end channel posts 80 projecting upwardly from the side members 28 of the frame 12, a pair of diverging braces 82 and 84 at each end of the beam 78, the brace 82 extending between the frame 12 and the beam 78, and the brace 84 extending between the frame 12 and the vertical support post 80, and a single diagonal brace 86 extending at an angle between the rear frame member 26 and the beam 78 at approximately the center thereof.

As noted supra, the machine 10 is to be drawn from a conventional tractor (not shown). This is made possible through a drawing tongue assembly 88 consisting of the pipe tongue 90 itself, welded to the forward frame member 24 and projecting centrally therefrom, this member 90 having an appropriate clevis means 92 on the outer end thereof. In addition, the assembly 88 includes a pair of rearwardly diverging tubular braces 94 coplanar with the central tongue member 90 and welded both to the outer end of the tongue member 90 and the front frame member 24 adjacent the opposite ends thereof, and a diagonal brace 96 extending between and welded to both the forward end of the tongue member 90 and the transversely extending beam 78.

As will be appreciated from the foregoing description, the depth of penetration of the cutter blades 42 can be controlled by a raising and lowering of the packing roller means 16. In those instances where the soil is extremely difficult to penetrate, it is possible to raise the packing roller completely off the ground, as shown in FIGURE 1, thereby transferring the entire weight of the device to the cutting roller means 14. In addition, the weight of the machine 10, or the individual roller means 14 and 16, can be increased by the introduction of ballast, for example water, to either or both of the drums 36 and 60.

Figure 4:
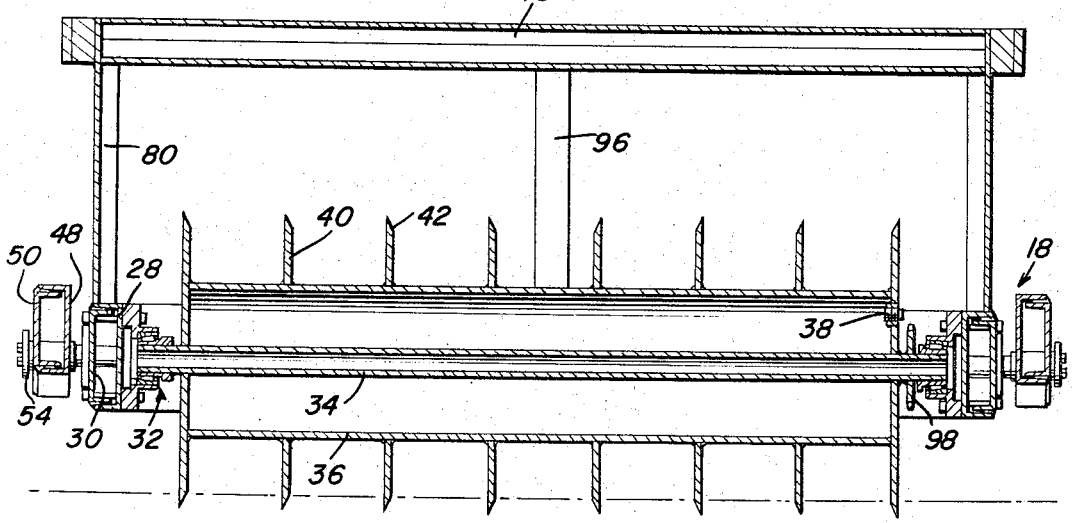
FIGURE 4 is an enlarged cross-sectional view taken substantially on a plane passing along line 4—4 in FIGURE 1.
Figure 5:
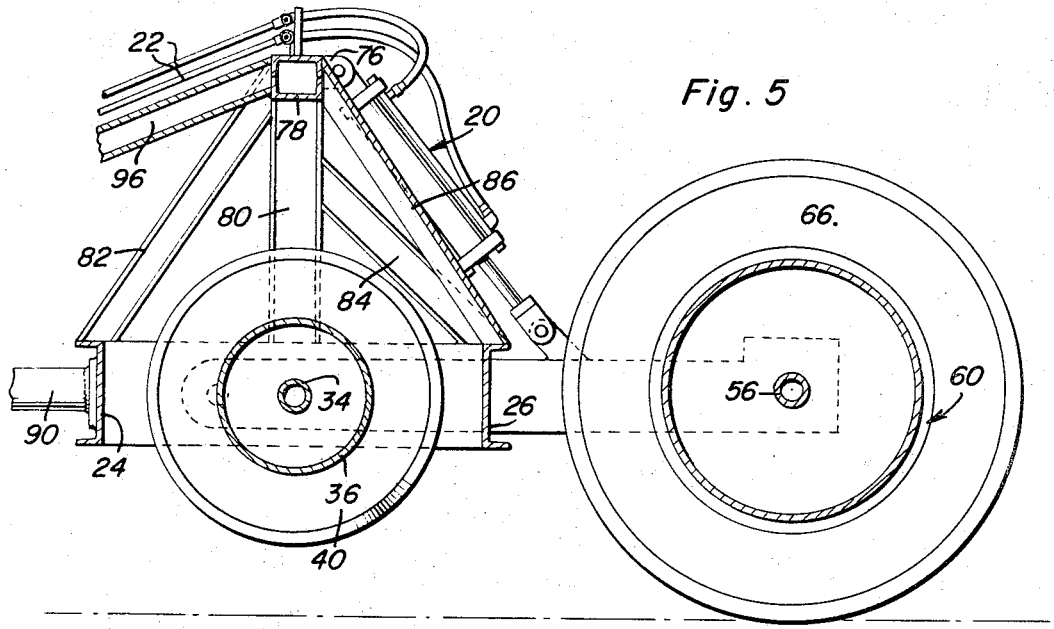
FIGURE 5 is a partial cross-sectional view taken substantially on a plane passing along line 5—5 in FIGURE 3.
Figure 6:
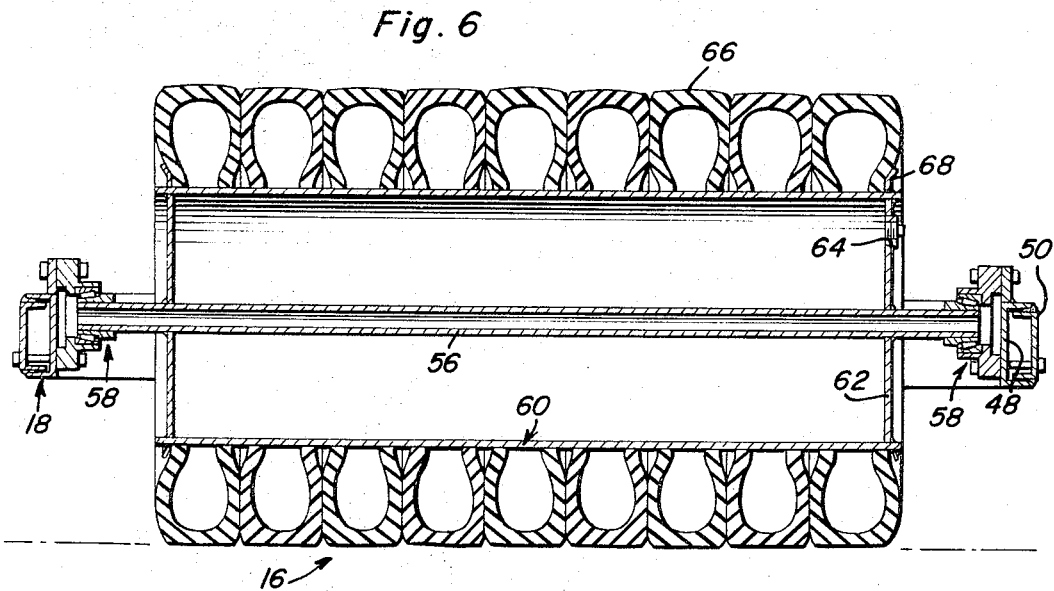
FIGURE 6 is an enlarged cross-sectional view taken substantially on a plane passing along line 6—6 in FIGURE 2.

In utilizing the machine 10 for purposes of erosion control, a layer or blanket of hay or straw mulch is spread and the machine 10 moved thereacross with the cutter blades 42 pushing and packing the mulch into the soil in continuous parallel rows so as to create, on sloping areas, small terraces or control dams. In most instances, the passage of the cutting drum 14 will embed the hay or straw mulch so as to allow the individual sprigs or stems of the mulch to project above the ground anywhere from one to four inches, thus providing a substantially more effective erosion control than is achieved in merely laying the mulch on top of the soil. In addition, if deemed desirable, the packing roller is also engaged with the ground behind the cutting roller so as to effect, subsequent to an embedding of the mulch, a packing of the embedded mulch into the ground. Incidently, with reference to FIGURE 4, it will be noted that a sprocket wheel 98 is fixed to the shaft 34 for rotation therewith, this sprocket 98 being desirable so as to effect the driving of a conventional seeder attachment (not shown) which might be mounted on the machine 10. In addition, the particular usefulness of the machine 10 in planting jointed or creeping grass should be recognized. This procedure basically involves embedding the sprigs of grass, through the cutting roller means, and subsequently packing the ground through the packing roller means.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is a follows:

1. An erosion control soil working machine comprising a support frame, a first transversely extending hollow ballast receiving cylindrical drum rotatably mounted on said frame, circular cutter blades fixed to said drum at longitudinally spaced points therealong, said circular cutter blades projecting radially outward from said drum for mulch embedding engagement with the ground, a second transversely extending hollow ballast receiving cylindrical drum, means mounting said second drum on said frame parallel to and rearward of the first drum, said second drum being mounted for rotation about its longitudinal axis, and relatively smooth surfaced circular packing means surrounding said second drum along substantially the full length of the second drum for mulch packing engagement with the ground, the means mounting said second drum on said frame consisting of a pair of elongated arms having the forward ends thereof pivotally fixed to the opposite sides of the frame for swinging movement in parallel vertical planes, said arms projecting rearward of the frame, said second drum being rotatably mounted between the rear ends of said arms for vertical movement therewith, and means engaged between and fixed to the arms and the frame for vertically swinging and selectively locking said arms, and thereby the second drum, into any one of a plurality of pivotally adjusted positions about the pivotally mounted forward ends of the arms between two extreme positions, one where only the cutter blades engage the ground and the second where only the packing means engages the ground.

2. The machine of claim 1 wherein said packing means consists of annular tire-like resilient members received about the second cylindrical drum, said second drum including, adjacent the opposite ends thereof, radially projecting keeper means fixed thereto for retention of the tire-like members thereon.

3. A soil working machine comprising a support frame including a pair of laterally spaced frame members, first roller means rotatably mounted between said frame members transversely thereof, said roller means projecting below the frame for engagment with the ground, said first roller means including a plurality of spaced circular soil cutting blades, a pair of laterally spaced elongated parallel rigid arms pivotally secured to the frame and projecting rearwardly thereof, second roller means rotatably mounted on and between said arms rearward of the frame, said second roller means including a plurality of packing elements fixed thereto, said frame including a rigid portion thereon located above the axis of rotation of the first roller means, and extensible means engaged between the frame portion and arms for effecting a pivotal adjustment of said arms relative to said frame so as to move said second roller means into and out of engagement with the ground, said last-mentioned means being sufficiently extensible so as to position the periphery of the second roller means relatively below the periphery of the first roller means and thereby raise the first roller means out of ground engagement, said machine being selectively supportable on either the first roller means or the second roller means, or a combination thereof.

4. The machine of claim 3 wherein said first roller means and said second roller means each includes a central hollow cylindrical drum capable of receiving ballast for varying the weight thereof.

5. The machine of claim 4 wherein said means for effecting a pivotal adjustment of the arms consists of a pair of extensible hydraulic double acting ram cylinders.

References Cited

UNITED STATES PATENTS

| 887,810 | 5/1908 | Jackson | 172—539 |
| 925,565 | 6/1909 | Curtis | 111—10 |
| 1,250,570 | 12/1917 | Dunham | 172—537 X |
| 1,592,250 | 7/1926 | Yerkes | 111—1 |
| 2,881,848 | 4/1959 | Liston | 172—555 |
| 2,966,948 | 1/1961 | Ulsh | 111—10 X |
| 2,978,967 | 4/1961 | MacDonald | 94—50 |
| 2,983,204 | 5/1961 | Floden | 94—50 |
| 3,232,255 | 2/1966 | Mitchell | 111—11 X |

ABRAHAM G. STONE, *Primary Examiner.*

WILLIAM A. SMITH III, *Examiner.*

J. R. OAKS, *Assistant Examiner.*